United States Patent
Ono (10) Patent No.: US 8,453,435 B2
(45) Date of Patent: Jun. 4, 2013

(54) METHOD FOR CONTROLLING EXHAUST GAS PURIFICATION DEVICE

(75) Inventor: Taisuke Ono, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 275 days.

(21) Appl. No.: 12/920,523

(22) PCT Filed: Mar. 13, 2009

(86) PCT No.: PCT/JP2009/054850
§ 371 (c)(1),
(2), (4) Date: Dec. 7, 2010

(87) PCT Pub. No.: WO2009/113650
PCT Pub. Date: Sep. 17, 2009

(65) Prior Publication Data
US 2011/0099980 A1    May 5, 2011

(30) Foreign Application Priority Data
Mar. 14, 2008  (JP) .................. 2008-065963

(51) Int. Cl.
*F01N 3/00* (2006.01)
(52) U.S. Cl.
USPC ............................... 60/292; 60/274
(58) Field of Classification Search
USPC .................................. 60/274, 292
See application file for complete search history.

(56) References Cited

U.S. PATENT DOCUMENTS

| 7,137,246 B2 * | 11/2006 | van Nieuwstadt et al. ..... 60/295 |
| 7,716,918 B2 | 5/2010 | Gabe et al. |
| 2003/0066287 A1 * | 4/2003 | Hirota et al. .................... 60/297 |
| 2008/0022664 A1 * | 1/2008 | Reuter et al. .................... 60/286 |
| 2009/0013674 A1 | 1/2009 | Ono |
| 2009/0081087 A1 * | 3/2009 | Kanda et al. .................. 422/169 |

FOREIGN PATENT DOCUMENTS

| JP | 6-200740 A | 7/1994 |
| JP | 2006-112313 A | 4/2006 |
| JP | 3852461 B2 | 9/2006 |
| JP | 2006-272115 A | 10/2006 |
| JP | 2006274875 A * | 10/2006 |
| WO | WO 2006/103915 A1 | 10/2006 |

OTHER PUBLICATIONS

International Search Report dated Jun. 2, 2009 with English translation (three (3) pages).
Japanese-language Office Action dated Sep. 4, 2012 (three (3) pages).

* cited by examiner

*Primary Examiner* — Thomas Denion
*Assistant Examiner* — Jason Shanske
(74) *Attorney, Agent, or Firm* — Crowell & Moring LLP (57) ABSTRACT

Disclosed is a method for controlling an exhaust gas purification device, wherein the regeneration operation includes main regeneration operation for detaching the nitrogen oxides adsorbed onto the nitrogen oxide adsorbing material, the method comprising: operating the first combustion device and the second combustion device while the exhaust gas is prevented from flowing into the branch exhaust passage subjected to the regeneration operation by the switching of a changeover valve during the regeneration operation; and decreasing the flow rate of the first mixture gas as the stage of the main regeneration operation advances.

3 Claims, 4 Drawing Sheets

METHOD FOR CONTROLLING EXHAUST GAS PURIFICATION DEVICE

TECHNICAL FIELD

The present invention relates to a device purifying exhaust gas discharged from internal combustion engines, such as diesel engines, gas engines, gasoline engines or gas turbine engines, or burning appliances, such as combustion furnaces and boilers, more particularly, to a method for controlling the exhaust gas purification device, connected to the exhaust passage of an internal combustion engine or the like performing normal operation in an excess air state, and eliminating nitrogen oxides.

BACKGROUND ART

Harmful components, such as nitrogen oxides, carbon monoxide and hydrocarbons, are contained in exhaust gas discharged from internal combustion engines, etc. Various kinds of devices have been developed conventionally to eliminate such substances from the exhaust gas thereby to purify the exhaust gas.

Figure 4:
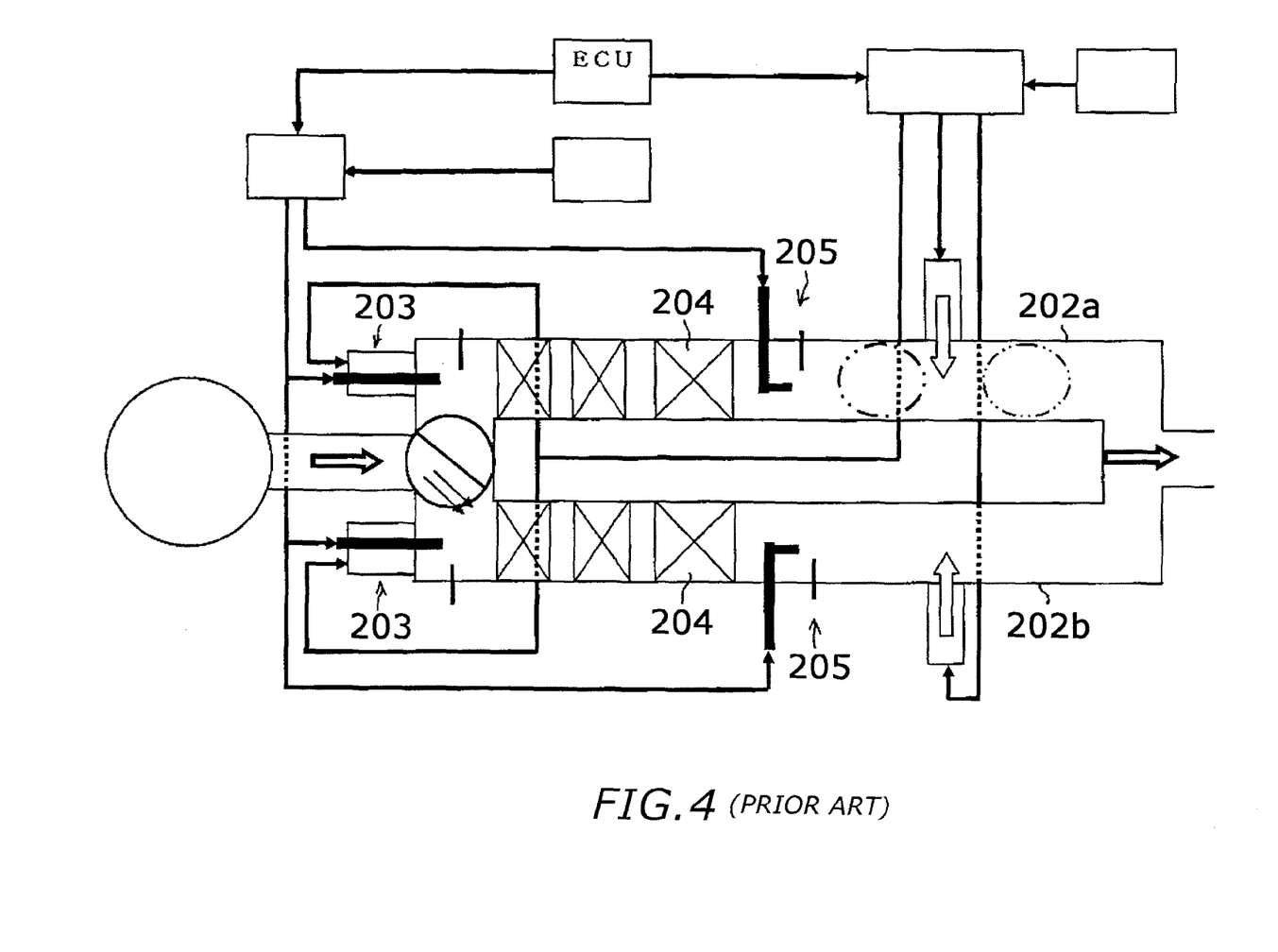
FIG. 4 is a schematic view showing the conventional exhaust gas purification device.

The applicant of the present invention developed an exhaust gas purification device and has already applied for a patent (Patent document 1). FIG. 4 shows an exhaust gas purification device shown in FIG. 1 of Patent document 1. As shown in FIG. 4, in the conventional exhaust gas purification device proposed by the applicant, a nitrogen oxide adsorbing material 204, a first combustion device (adsorbed material detachment unit) 203 and a second combustion device 205 are provided for each of a plurality of branch exhaust passages 202a and 202b connected to an internal combustion engine or the like. The exhaust gas discharged from the internal combustion engine or the like. is supplied only to one of the branch exhaust passages, i.e., 202a (or 202b), and not supplied to the other branch exhaust passage 202b (or 202a). Furthermore, in the branch exhaust passage 202a to which the exhaust gas is supplied, nitrogen oxides are adsorbed onto the nitrogen oxide adsorbing material 204 and eliminated, and carbon monoxide and hydrocarbons are oxidized to carbon dioxide and water by the oxidation catalyst contained in the nitrogen oxide adsorbing material 204. On the other hand, in the branch exhaust passage 202b to which the supply of the exhaust gas is shut off, nitrogen oxides are detached from the nitrogen oxide adsorbing material 204 since the first combustion device 203 generates a reducing atmosphere, and the detached nitrogen oxides are reduced to nitrogen by the combustion device 205. In other words, normal operation in which nitrogen oxides are adsorbed onto the nitrogen oxide adsorbing material 204 is performed in the one branch exhaust passage 202a. At the same time, in the other branch exhaust passage 202b, regeneration operation in which nitrogen oxides are detached from the adsorbed material detachment unit 204 is performed. As a result, the adsorption capability of the nitrogen oxide adsorbing material 204 is maintained.

The exhaust gas purification device shown in FIG. 4 is a purification device that does not use a three-way catalyst, ammonia, urea, etc. The three-way catalyst serving as a catalyst capable of decomposing nitrogen oxides, carbon monoxide and hydrocarbons simultaneously does not act effectively in an excess air condition. In the case of a purification device that uses ammonia, etc., the device itself is very complicated and expensive. In addition, maintenance cost is necessary for ammonia, etc. serving reducing agents, and it is necessary to provide a system for supplying ammonia, etc., whereby many problems occur. In the exhaust gas purification device shown in FIG. 4, these problems have been solved. The exhaust gas purification device shown in FIG. 4 can eliminate harmful components (nitrogen oxides, carbon monoxide and hydrocarbons) from the exhaust gas discharged from an internal combustion engine or the like operating in an excess air condition to purify the exhaust gas and can maintain its purification capability without lowering the capability.

Patent document 1: Japanese Patent Application Laid-open Publication No. 2006-272115

SUMMARY OF INVENTION

Technical Problem

In the exhaust gas purification device shown in FIG. 4, the first combustion device (adsorbed material detachment unit) 203 causes a combustion reaction in an excess air condition, and a reducing atmosphere is supplied to the nitrogen oxide adsorbing material 204. The reducing atmosphere is required to be supplied continuously until the regeneration operation is completed. However, when the regeneration operation is being performed in one branch exhaust passage, the normal operation cannot be performed in the same branch exhaust passage. The increase in the implementation time of the regeneration operation leads to the lowering in the processing efficiency of the exhaust gas purification device. On the other hand, for the purpose of shortening the implementation time of the regeneration operation, it is conceived to increase the flow rate of the reducing atmosphere. However, when the flow rate of the reducing atmosphere is increased, the consumption energy (the consumption amount of reducing agents) required for the generation of the reducing atmosphere increases. The consumption energy corresponds to the consumption amount of fuel in the case that a combustion device is used as a device generating a reducing atmosphere (in the case of the exhaust gas purification device shown in FIG. 4). In other words, if an attempt is made to increase the detachment amount of nitrogen oxides from the nitrogen oxide adsorbing material, the consumption energy required for the detachment or the time (detachment time) required for the detachment increases eventually.

The present invention is intended to efficiently increase the detachment amount of nitrogen oxides by supplying a reducing atmosphere without increasing the consumption energy required for the detachment and the time required for the detachment in an exhaust gas purification device configured so that nitrogen oxides are detached from a nitrogen oxide adsorbing material.

Solution to Problem

An aspect of the present invention is to provide a method for controlling an exhaust gas purification device, the exhaust gas purification device comprising: a plurality of branch exhaust passages connected to an exhaust passage on the engine side of an internal combustion engine or a burning appliance; an exhaust gas shutoff unit switching between allowing and shutting off the flow of the exhaust gas into the respective branch exhaust passages from the exhaust passage on the engine side by opening or closing the exhaust inlets of the respective branch exhaust passages; a nitrogen oxide adsorbing material, disposed inside each of the respective branch exhaust passages, temporarily adsorbing nitrogen oxides in an excess air atmosphere, and detaching the adsorbed nitrogen oxides in a rising temperature atmosphere or a reducing atmosphere; a first combustion device, disposed on the exhaust upstream side of the nitrogen oxide adsorbing material inside each of the respective branch exhaust passages, and comprising an air supply unit and a fuel supply unit and an ignition unit, and supplying and burning a first mixture gas of fuel and air; and a second combustion device, disposed on the exhaust downstream side of the nitrogen oxide adsorbing material inside each of the respective branch exhaust passages, and comprising an air supply unit and a fuel supply unit and an ignition unit, wherein there are normal operation and regeneration operation performed in the respective branch exhaust passages, and wherein the regeneration operation includes main regeneration operation for detaching the nitrogen oxides adsorbed onto the nitrogen oxide adsorbing material, and the main regeneration operation has at least two stages of operation, the method comprising the steps of: allowing the flow of the exhaust gas into the branch exhaust passage subjected to the normal operation by the switching of the exhaust gas shutoff unit during the normal operation; operating the first combustion device and the second combustion device while the exhaust gas is prevented from flowing into the branch exhaust passage subjected to the regeneration operation by the switching of the exhaust gas shutoff unit during the regeneration operation; controlling the excess air ratio $\lambda$ of the first mixture gas within the range of $\lambda<1.0$ during the main regeneration operation; and decreasing the flow rate of the first mixture gas as the stage of the main regeneration operation advances.

It is preferable that the aspect of the present invention adopts the following configurations (a) to (c).

(a) The aspect of the present invention is to provide the method further comprising: controlling the excess air ratio $\lambda$ of the first mixture gas within the range of $0.6<\lambda<1.0$ during the main regeneration operation.

(b) The aspect of the present invention is to provide the method, wherein the regeneration operation includes pre-regeneration operation as a pre-stage of the main regeneration operation, the method further comprising: controlling the excess air ratio $\lambda$ of the first mixture gas within the range of $\lambda>1.0$ during the pre-regeneration operation.

(c) The aspect of the present invention is to provide the method wherein the regeneration operation includes post-regeneration operation as a post-stage of the main regeneration operation, the method further comprising: controlling the excess air ratio $\lambda$ of the first mixture gas within the range of $\lambda>1.0$ during the post-regeneration operation.

ADVANTAGEOUS EFFECTS OF INVENTION

According to the aspect of the present invention, the detachment amount of the nitrogen oxides can be increased efficiently without increasing the consumption energy and the time required for the detachment by decreasing the flow rate of the first mixture gas as the stage of the main regeneration operation advances. Furthermore, since the temperature of the nitrogen oxide adsorbing material is raised in the initial stage of the main regeneration operation, the start timing of the detachment is also advanced.

Furthermore, According to the configuration (a), the nitrogen oxides can be detached effectively from the nitrogen oxide adsorbing material.

Furthermore, According to the configuration (b), the amount of the particulate matter trapped by the nitrogen oxide adsorbing material can be decreased. Furthermore, the temperature of the nitrogen oxide adsorbing material can be raised before the start of the main regeneration operation, and the efficiency of the main regeneration operation can be improved.

Furthermore, According to the configuration (c), the reducing agents attached to the nitrogen oxide adsorbing material can be eliminated, whereby the amounts of the reducing agents discharged outside the purification device when the normal operation is performed can be decreased. Furthermore, the amount of the particulate matter trapped by the nitrogen oxide adsorbing material can also be decreased.

REFERENCE SIGNS LIST 1 exhaust gas purification device
2, 3 branch exhaust passage
2a, 3a exhaust inlet
2b, 3b exhaust outlet
4 shutoff valve
5 nitrogen oxide adsorbing material
6 first combustion device
7 second combustion device
10 controller
61, 71, 151 air nozzle (a part of air supply unit)
62, 72 fuel nozzle (a part of fuel supply unit)
63, 73 ignition plug (ignition unit)
100 exhaust passage on the engine side
100b exhaust outlet Description of Embodiments (Exhaust Gas Purification Device According to Embodiment)

An exhaust gas purification device 1 according to an embodiment will be described below referring to FIG. 1. The exhaust gas purification device 1 is a device connected to an exhaust passage 100 on the engine side of an internal combustion engine or a burning appliance.

The internal combustion engine or the burning appliance burns a mixture gas of air and fuel and produces exhaust gas. The exhaust gas contains nitrogen oxides (NOx); carbon monoxide (CO) and hydrocarbons (HC) as unburned matters; etc. The exhaust passage 100 on the engine side is an exhaust passage provided for the internal combustion engine or the burning appliance. The exhaust gas generated in the internal combustion engine or the burning appliance is discharged from the exhaust passage 100 on the engine side.

Figure 1:
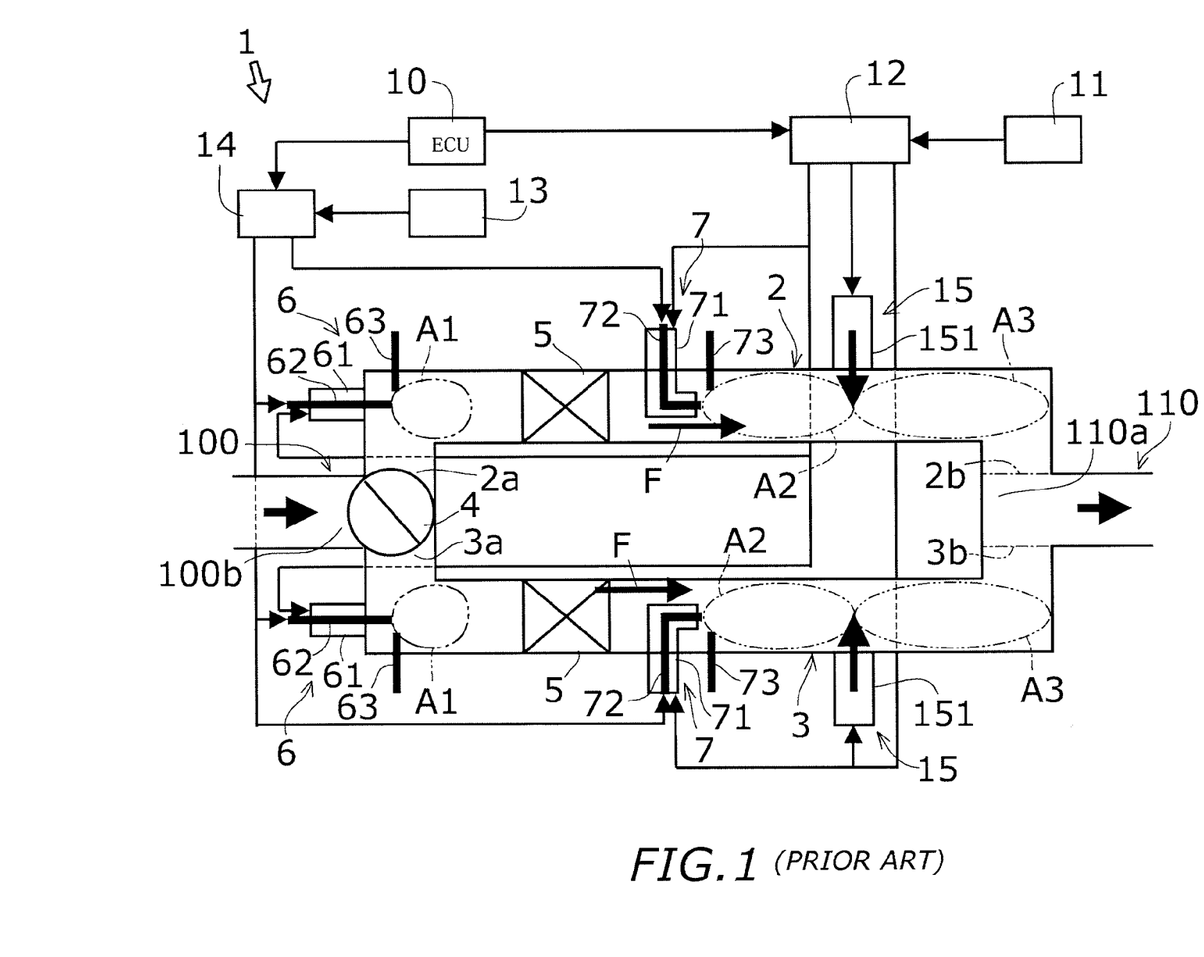
FIG. 1 is a schematic view showing an exhaust gas purification device.

FIG. 1 shows the exhaust passage 100 on the engine side, a plurality (two in this embodiment) of branch exhaust passages 2 and 3, and a junction exhaust passage 110, these serving as exhaust gas passages. The branch exhaust passages 2 and 3 are exhaust passages provided for the exhaust gas purification device 1. The exhaust outlet 100b of the exhaust passage 100 on the engine side is connected to the exhaust inlets 2a and 3a of the branch exhaust passages 2 and 3. The exhaust outlets 2b and 3b of the branch exhaust passages 2 and 3 are connected to the exhaust inlet 110a of the junction exhaust passage 110. These exhaust passages 100, 2, 3 and 110 are passages shut off from the outside air and composed of pipes, for example. The junction exhaust passage 110 may be an exhaust passage provided for the exhaust gas purification device 1 or may be the exhaust passage of the internal combustion engine or the burning appliance.

Arrow F indicates the direction of the gas (exhaust gas) flowing inside each of the branch exhaust passages 2 and 3. The side indicated by arrow F is the exhaust downstream side, and the side opposite to the side indicated by arrow F is the exhaust upstream side.

The exhaust gas from the exhaust passage 100 on the engine side flows from the exhaust inlet 2a to the exhaust outlet 2b inside the branch exhaust passage 2, and flows from the exhaust inlet 3a to the exhaust outlet 3b inside the branch exhaust passage 3.

The exhaust gas purification device 1 is equipped with a controller (electronic control unit) 10. The controller 10 controls various devices (described later) provided for the exhaust gas purification device 1.

The exhaust gas purification device 1 is equipped with an exhaust gas shutoff unit which can shut off the flow of the exhaust gas into the branch exhaust passages 2 and 3 from the exhaust passage 100 on the engine side by closing the exhaust inlets 2a and 2b of the branch exhaust passages 2 and 3.

More specifically, a gas shutoff valve 4 as the exhaust gas shutoff unit is provided in the junction portion of the exhaust passage 100 on the engine side and the branch exhaust passages 2 and 3. The gas shutoff valve 4 shuts off or allows the flow of the exhaust gas into the exhaust inlets 2a and 3a of the branch exhaust passages 2 and 3 from the exhaust outlet 100b of the exhaust passage 100 on the engine side. The switching between shutting off and allowing the flow using the shutoff valve 4 is controlled by the controller 10. The exhaust gas shutoff unit may be a group of changeover valves each provided for each of the respective branch exhaust passages 2 and 3. In this case, each of the changeover valves is provided at each of the exhaust inlet 2a of the branch exhaust passage 2 and the exhaust inlet 3a of the branch exhaust passage 3.

The exhaust gas purification device 1 is equipped with a nitrogen oxide adsorbing material 5, a first combustion device 6, a second combustion device 7 and an auxiliary air supply unit 15 inside each of the branch exhaust passages 2 and 3. Inside each of the branch exhaust passages 2 and 3, the first combustion device 6, the nitrogen oxide adsorbing material 5, the second combustion device 7 and the auxiliary air supply unit 15 are arranged in this order to the exhaust downstream side.

The nitrogen oxide adsorbing material 5 temporarily adsorbs the nitrogen oxides in an excess air atmosphere and detaches the adsorbed nitrogen oxides in a reducing atmosphere. Furthermore, when the nitrogen oxide adsorbing material 5 is placed in a rising temperature atmosphere in addition to the reducing atmosphere, the detachment of the nitrogen oxides is performed more effectively.

An excess air state is herein defined as a state in which the excess air ratio (the value obtained by dividing the air-fuel ratio of the supplied mixture gas by an ideal air-fuel ratio) in the mixture gas of air (oxygen) and fuel is larger than one. In addition, a state in which the excess air ratio is smaller than one is an excess fuel state. A reducing atmosphere is defined as an atmosphere of a gas being in a state in which the amount of a reducing agent is excessive and the amount of oxygen is insufficient when combustion (oxidation-reduction reaction) occurs.

The nitrogen oxide adsorbing material 5 also contains catalyst components having an oxidation action.

The first combustion device 6 includes an air supply unit, a fuel supply unit and an ignition unit. Furthermore, the first combustion device 6 supplies and burns a first mixture gas of fuel and air. The first combustion device 6 can generate a reducing atmosphere containing unburned matters (carbon monoxide and hydrocarbons) serving as reducing agents by causing a combustion reaction in an excess air condition, and can generate a rising temperature atmosphere by the heat of the combustion reaction.

The air supply unit of the first combustion device 6 is equipped with an air supply unit 11, an air amount adjustment unit 12 and an air nozzle 61. The air supply unit 11 takes in outside air and supplies the air to the air amount adjustment unit 12. The air amount adjustment unit 12 adjusts the amount of the supplied air (outside air) and supplies the air to the air nozzle 61. The air nozzle 61 is a nozzle being open in a first combustion zone A1 inside each of the branch exhaust passages 2 and 3. The air supplied to the air nozzle 61 is injected into each of the branch exhaust passages 2 and 3. The controller 10 controls the air amount adjustment unit 12, by adjusting the amount of the air supplied to the air nozzle 61.

The fuel supply unit of the first combustion device 6 is equipped with the controller 10, a fuel tank 13, a fuel amount adjustment unit 14 and a fuel nozzle 62. Fuel is stored in the fuel tank 13. The fuel amount adjustment unit 14 adjusts the amount of the fuel supplied from the fuel tank 13 and supplies the fuel to the fuel nozzle 62. The fuel nozzle 62 is a nozzle being open in the first combustion zone A1 inside each of the branch exhaust passages 2 and 3. The first combustion zone A1 is positioned on the exhaust upstream side of the nitrogen oxide adsorbing material 5. The fuel supplied to the fuel nozzle 62 is injected into each of the branch exhaust passages 2 and 3. Furthermore, the controller 10 controls the fuel amount adjustment unit 14, thereby adjusting the amount of the fuel supplied to the fuel nozzle 62.

The ignition unit of the first combustion device 6 is an ignition plug 63. The ignition plug 63 is a device performing ignition inside each of the branch exhaust passages 2 and 3. The air injected from the air nozzle 61 is mixed with the fuel injected from the fuel nozzle 62 to form a mixture gas in the first combustion zone A1 inside each of the branch exhaust passages 2 and 3. The ignition plug 63 ignites this mixture gas to cause combustion.

The first combustion device 6 generates a rising temperature atmosphere and a reducing atmosphere on the exhaust downstream side of the first combustion device 6. The rising temperature atmosphere is generated by the combustion heat of the mixture gas. The reducing atmosphere is generated by the production of unburned matters (carbon monoxide and hydrocarbons) by virtue of the combustion of the mixture gas. Therefore, the first combustion device 6 has the air supply unit and serves as a unit changing the atmosphere of the air supplied from the air supply unit into the rising temperature atmosphere and the reducing atmosphere.

The position of the first combustion device 6 indicates the positions of the air nozzle 61, the fuel nozzle 62 and the ignition plug 63. The first combustion device 6 is disposed on the exhaust upstream side of the nitrogen oxide adsorbing material 5 inside each of the branch exhaust passages 2 and 3.

The second combustion device 7 includes an air supply unit, a fuel supply unit and an ignition unit. The second combustion device 7 reduces the nitrogen oxides to nitrogen by causing a combustion reaction in an excess fuel condition.

The air supply unit of the second combustion device 7 is similar to the air supply unit of the first combustion device 6. The air supply unit of the second combustion device 7 is equipped with the air supply unit 11, the air amount adjustment unit 12 and an air nozzle 71. In other words, the air nozzle 61 in the air supply unit of the first combustion device 6 is replaced with the air nozzle 71 in the air supply unit of the second combustion device 7. The air nozzle 71 is open in a second combustion zone A2 inside each of the branch exhaust passages 2 and 3.

The fuel supply unit of the second combustion device 7 is also similar to the fuel supply unit of the first combustion device 6. The fuel supply unit of the second combustion device 7 is equipped with the fuel tank 13, the fuel amount adjustment unit 14 and a fuel nozzle 72. In other words, the fuel nozzle 62 in the air supply unit of the first combustion device 6 is replaced with the fuel nozzle 72 in the fuel supply unit of the second combustion device 7. The fuel nozzle 72 is open in the second combustion zone A2 inside each of the branch exhaust passages 2 and 3.

The ignition unit of the second combustion device 7 is also similar to the ignition unit of the first combustion device 6. The ignition unit of the second combustion device 7 is an ignition plug 73 that is used to perform ignition in the second combustion zone A2 inside each of the branch exhaust passages 2 and 3.

The position of the second combustion device 7 indicates the positions of the air nozzle 71, the fuel nozzle 72 and the ignition plug 73. The second combustion device 7 is disposed on the exhaust downstream side of the nitrogen oxide adsorbing material 5 inside each of the branch exhaust passages 2 and 3.

The auxiliary air supply unit 15 is similar to the air supply units of the first combustion device 6 and the second combustion device 7. The auxiliary air supply unit 15 is equipped with the air supply unit 11, the air amount adjustment unit 12 and an air nozzle 151. The air nozzle 151 is equivalent to the air nozzle 61 of the first combustion device 6 and the air nozzle 71 of the second combustion device 7. The air nozzle 151 is open in a third combustion zone A3 inside each of the branch exhaust passages 2 and 3.

The position of the auxiliary air supply unit 15 indicates the position of the air nozzle 151. The auxiliary air supply unit 15 is disposed on the exhaust downstream side of the air supply unit of the second combustion device 7 inside each of the branch exhaust passages 2 and 3.

(Control Method According to this Embodiment)

Next, a method for controlling the exhaust gas purification device 1 according to this embodiment will be described below. The control method of this embodiment is a method for controlling the above-mentioned exhaust gas purification device 1 as described below.

Normal operation and regeneration operation are performed in the branch exhaust passages 2 and 3 under the control of the controller 10.

During the normal operation, the exhaust gas is passed through the branch exhaust passages 2 and 3 subjected to the normal operation by the switching of the shutoff valve 4. The nitrogen oxides are adsorbed onto the nitrogen oxide adsorbing material 5 by virtue of the normal operation.

During the regeneration operation, the first combustion device 6 and the second combustion device 7 are operated while the exhaust gas is prevented from flowing to the branch exhaust passage 2 or 3 subjected to the regeneration operation by the switching of the shutoff valve 4. The regeneration operation includes operation (main regeneration operation described later) during which the adsorption capability of the nitrogen oxide adsorbing material 5 is regenerated by detaching the nitrogen oxides from the nitrogen oxide adsorbing material 5 and operation (pre-regeneration operation and post-regeneration operation described later) during which the reducing agents (unburned matters) and particulate matter trapped by the nitrogen oxide adsorbing material 5 are oxidized and eliminated.

During the normal operation, the particulate matter contained in the exhaust gas is trapped by the nitrogen oxide adsorbing material 5. The particulate matter is defined as particles of carbon, hydrocarbons, sulfates, etc. The increase in the trapped amount of the particulate matter also lowers the adsorption capability of the nitrogen oxide adsorbing material 5. For this reason, the particulate matter trapped by the nitrogen oxide adsorbing material 5 is also eliminated during the regeneration operation.

Figure 2:
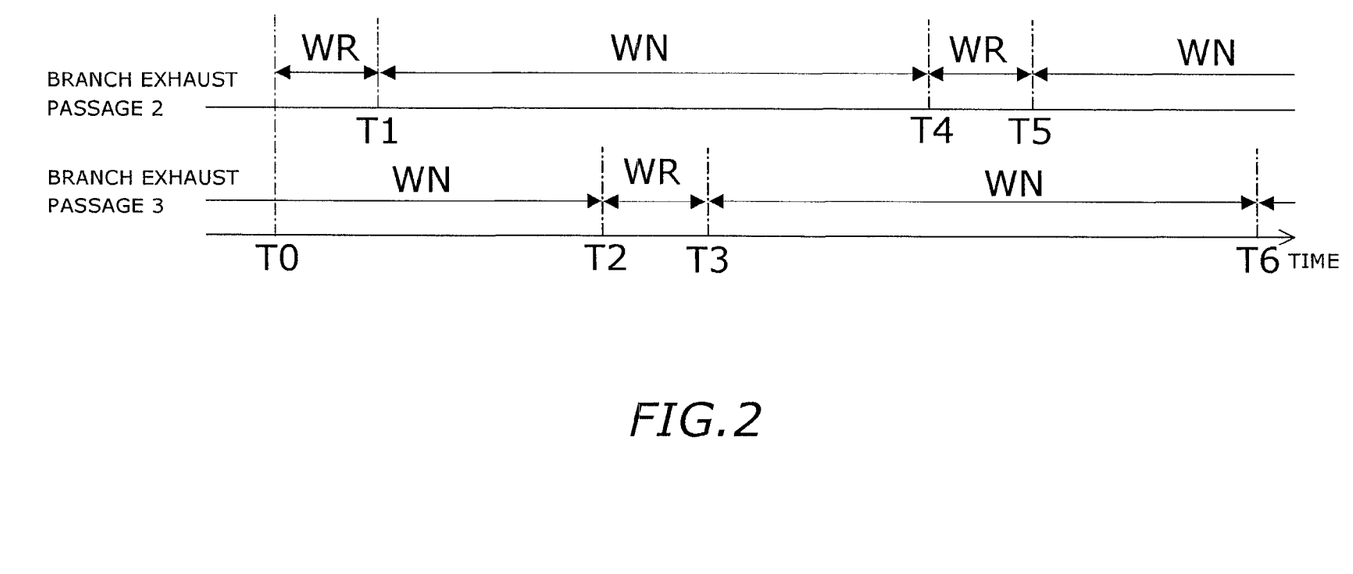
FIG. 2 is a time table for normal operation and regeneration operation in branch exhaust passages.

FIG. 2 is an example of a time table for the normal operation and the regeneration operation in the respective branch exhaust passages 2 and 3. In each of the branch exhaust passages 2 and 3, the normal operation and the regeneration operation are performed periodically and repeatedly. The continuous implementation time of the normal operation is defined as normal operation time WN, and the continuous implementation time of the regeneration operation is defined as regeneration operation time WR.

The switching between the normal operation and the regeneration operation is performed after the continues implementation time of the operation has passed a predetermined time. Alternatively, it may be possible that a sensor detecting the amount of the nitrogen oxides adsorbed onto the nitrogen oxide adsorbing material 5 is provided and the switching between the normal operation and the regeneration operation is performed on the basis of the detected value of the amount of the adsorption.

The normal operation is always performed in either one of the branch exhaust passages 2 and 3 so that the discharge of the exhaust gas is not interrupted. This means the following. Although the normal operation and the regeneration operation are performed repeatedly in the branch exhaust passages 2 and 3, not all the branch exhaust passages 2 and 3 are subjected to the regeneration operation simultaneously. On the other hand, it may be possible that all the branch exhaust passages 2 and 3 are subjected to the normal operation simultaneously. In the example shown in FIG. 2, the normal operation in the branch exhaust passage 2 is partly overlapped with the normal operation in the branch exhaust passage 3 along the time axis. On the other hand, the branch exhaust passages 2 and 3 are not subjected to the regeneration operation simultaneously.

The controller 10 starts the regeneration operation in the branch exhaust passage 2 and starts the normal operation in the branch exhaust passage 3 at operation start time T0 (the time when the operation of the exhaust gas purification device 1 is started). In other words, the controller 10 controls the shutoff valve 4 to shut off the communication between the exhaust passage 100 on the engine side and the branch exhaust passage 2 and to establish the communication between the exhaust passage 100 on the engine side and the branch exhaust passage 3. For this reason, the exhaust gas flows into the branch exhaust passage 3. In addition, the controller 10 operates the first combustion device 6, the second combustion device 7 and the auxiliary air supply unit 15 inside the branch exhaust passage 2 subjected to the regeneration operation.

In the branch exhaust passage 2, the regeneration operation is performed in a period from the operation start time T0 to time T1, the normal operation is performed in a period from time T1 to time T4, and the regeneration operation is performed in a period from time T4 to time T5. The period from time T0 to time T1 and the period from time T4 to time T5 each correspond to the regeneration operation time WR. In addition, the period from time T1 to time T4 corresponds to the normal operation time WN.

In the branch exhaust passage 3, the normal operation is performed in a period from the operation start time T0 to time T2, the regeneration operation is performed in a period from time T2 to time T3, and the normal operation is performed in a period from time T3 to time T6. The period from time T3 to time T6 corresponds to the normal operation time WN. The period from time T2 to time T3 corresponds to the regeneration operation time WR.

Figure 3:
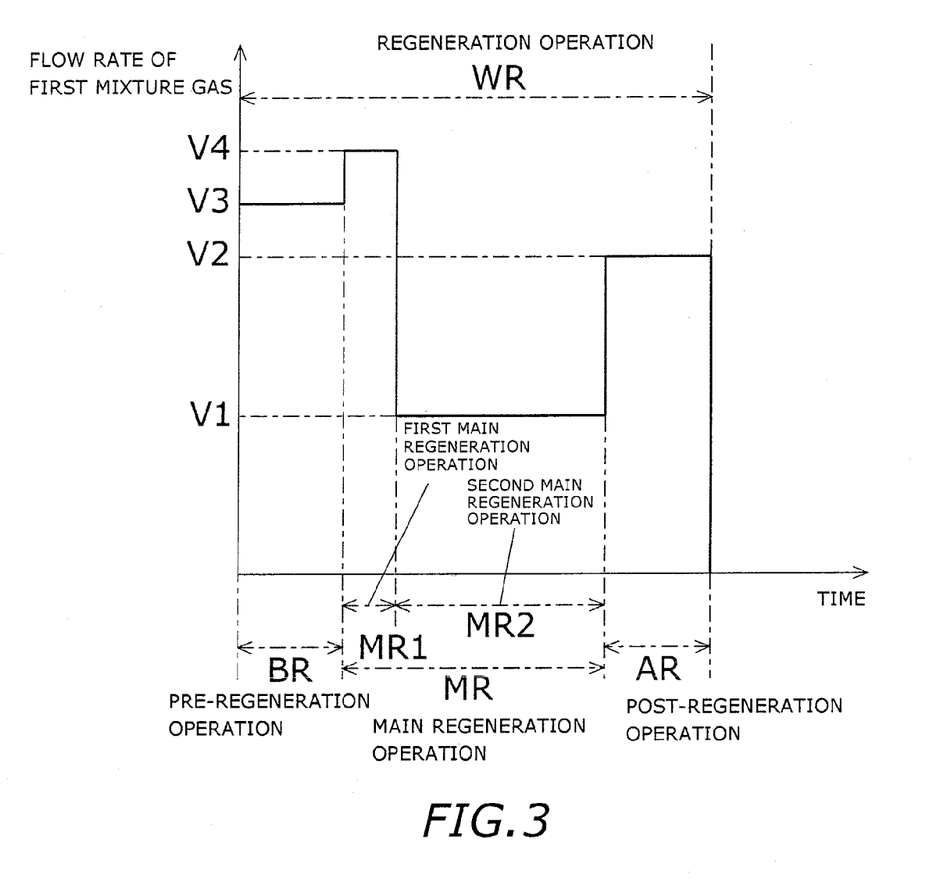
FIG. 3 is a diagram showing how the flow rate of gas changes with time during the regeneration operation.

As shown in FIG. 3, the regeneration operation includes the pre-regeneration operation, the main regeneration operation and the post-regeneration operation when described in detail. During the main regeneration operation, the nitrogen oxides are detached from the nitrogen oxide adsorbing material 5 and reduced. During the pre-regeneration operation, the reducing agents (unburned matters) and the particulate matter trapped by the nitrogen oxide adsorbing material 5 are oxidized and eliminated. During the post-regeneration operation, the particulate matter and the unburned matters (hydrocarbons and carbon monoxide) trapped by the nitrogen oxide adsorbing material 5 are oxidized and eliminated. It may be possible that the regeneration operation is configured so as not to include one or both of the pre-regeneration operation and the post-regeneration operation.

The main regeneration operation is composed of at least two stages. In this embodiment, the main regeneration operation is composed of two stages, i.e., first main regeneration operation and second main regeneration operation.

During the regeneration operation, the pre-regeneration operation, the first main regeneration operation, the second main regeneration operation and the post-regeneration operation are performed in this order in proper time sequence.

The first combustion device 6 operates in each of the pre-regeneration operation, the main regeneration operation and the post-regeneration operation. By the operation of the first combustion device 6, the first mixture gas of fuel and air is produced in the first combustion zone A1 and burned. By the combustion of the first mixture gas, a first burned gas is produced.

During the pre-regeneration operation, the operation of the first combustion device 6 is controlled as described below. The excess air ratio $\lambda$ of the first mixture gas is controlled within the range of $\lambda > 1.0$. The flow rate of the first mixture gas (the amount of air supply per unit time) is controlled to a flow rate V3. The implementation time of the pre-regeneration operation is controlled to a time period BR.

During the first main regeneration operation, the operation of the first combustion device 6 is controlled as described below. The excess air ratio $\lambda$ of the first mixture gas is controlled within the range of $0.6 < \lambda < 1.0$. The flow rate of the first mixture gas (the amount of air supply per unit time) is controlled to a flow rate V4. The implementation time of the pre-regeneration operation is controlled to a time period MR1.

During the second main regeneration operation, the operation of the first combustion device 6 is controlled as described below. The excess air ratio $\lambda$ of the first mixture gas is controlled within the range of $0.6 < \lambda < 1.0$. The flow rate of the first mixture gas (the amount of air supply per unit time) is controlled to a flow rate V1. The implementation time of the pre-regeneration operation is controlled to a time period MR2.

The flow rate V4 during the first main regeneration operation is higher than the flow rate V1 during the second main regeneration operation. In other words, the flow rate of the first mixture gas decreases as the stage of the main regeneration operation advances. Furthermore, the implementation time (the time period MR1) of the first main regeneration operation is shorter than the implementation time (the time period MR2) of the second main regeneration operation.

During the post-regeneration operation, the operation of the first combustion device 6 is controlled as described below.

The excess air ratio $\lambda$ in the first combustion zone A1 is controlled within the range of $\lambda > 1.0$. The flow rate of the gas supplied to the first combustion zone A1 (the amount of air supply per unit time) is controlled to a flow rate V2. The implementation time of the post-regeneration operation is controlled to a time period AR.

(Operation of this Embodiment)

Next, the operation of the exhaust gas purification device 1 according to the control method of this embodiment will be described below.

When the operation of the internal combustion engine or the like connected to the exhaust gas purification device 1 is started, the controller 10 starts operation of the exhaust gas purification device 1 accordingly. As the exhaust gas purification device 1 operates, the controller 10 performs the normal operation or the regeneration operation in each of the branch exhaust passages 2 and 3.

The normal operation is performed as described below. The exhaust gas passes through the branch exhaust passage 2 (or 3) subjected to the normal operation. When the exhaust gas passes through the nitrogen oxide adsorbing material 5, the nitrogen oxides contained in the exhaust gas are adsorbed onto the nitrogen oxide adsorbing material 5. The nitrogen oxides are thus eliminated from the exhaust gas. Furthermore, since the nitrogen oxide adsorbing material 5 has oxidation catalyst components, the unburned matters (carbon monoxide and hydrocarbons) contained in the exhaust gas are oxidized. Therefore, the carbon monoxide and hydrocarbons are oxidized into carbon dioxide and water and rendered harmless. The carbon dioxide and hydrocarbons are thus eliminated from the exhaust gas.

The exhaust gas having passed through the nitrogen oxide adsorbing material 5 is discharged into the atmosphere via the junction exhaust passage 110.

When the implementation of the normal operation continues, the amount of the nitrogen oxides adsorbed onto the nitrogen oxide adsorbing material 5 increases, and the adsorption capability of the nitrogen oxide adsorbing material 5 lowers. For the purpose of regenerating the adsorption capability of the nitrogen oxide adsorbing material 5, it is necessary to detach the nitrogen oxides from the nitrogen oxide adsorbing material 5. The adsorption capability of the nitrogen oxide adsorbing material 5 is regenerated by virtue of the regeneration operation.

When the implementation time of the normal operation, i.e., the normal operation time WN, has passed, the controller 10 stops the normal operation in the branch exhaust passage 2 (or 3) subjected to the normal operation and starts the regeneration operation.

The regeneration operation is performed as described below. The flow of the exhaust gas into the branch exhaust passage 2 (or 3) subjected to the regeneration operation is shut off. During the regeneration operation, the pre-regeneration operation, the main regeneration operation and the post-regeneration operation are performed in this order under the control of the controller 10. The controller 10 operates the first combustion device 6 during each of the pre-regeneration operation, the main regeneration operation and the post-regeneration operation. Furthermore, the first mixture gas (the mixture gas of air and fuel) generated by the first combustion device 6 is burned, and the first burned gas is produced. Since air is injected from the air nozzle 61, a gas flow is formed inside the branch exhaust passage 2 (or 3) to the exhaust downstream side. As a result, the first burned gas is fed to the exhaust downstream side (to the nitrogen oxide adsorbing material 5).

During the pre-regeneration operation, the controller 10 operates the first combustion device 6 in an excess air condition. Therefore, when the first burned gas passes through the nitrogen oxide adsorbing material 5, the particulate matter trapped by the nitrogen oxide adsorbing material 5 is oxidized and eliminated. Moreover, the temperature of the nitrogen oxide adsorbing material 5 is raised by the heat of the first burned gas. Therefore, the temperature of the nitrogen oxide adsorbing material 5 has already been raised during the main regeneration operation following the pre-regeneration operation.

The first burned gas having passed through the nitrogen oxide adsorbing material 5 is fed to the exhaust downstream side and discharged into the atmosphere via the junction exhaust passage 110.

During the main regeneration operation (the first main regeneration operation and the second main regeneration operation), the controller 10 operates the first combustion device 6 in an excess fuel condition. Therefore, the first burned gas contains large amounts of carbon monoxide and hydrocarbons, i.e., unburned matters. The carbon monoxide and hydrocarbons serve as reducing agents for the nitrogen oxides. For this reason, when the first burned gas passes through the nitrogen oxide adsorbing material 5, the nitrogen oxide adsorbing material 5 is placed in a reducing atmosphere. Moreover, the nitrogen oxide adsorbing material 5 is also placed in a rising temperature atmosphere by the heat of the first burned gas. Since the nitrogen oxide adsorbing material 5 is placed in the reducing atmosphere (and the rising temperature atmosphere), the nitrogen oxides adsorbed onto the nitrogen oxide adsorbing material 5 are detected from the nitrogen oxide adsorbing material 5. The detached nitrogen oxides are fed to the exhaust downstream side (to the second combustion zone A2) while being mixed with the first burned gas.

In particular, the main regeneration operation is composed of a first stage (the first main reducing atmosphere) during which the flow rate is high and a second stage (the second main regeneration operation) during which the flow rate is low. This is due to the following reason. When the flow rate is raised in the initial stage of the main regeneration operation, the start timing of the detachment is advanced. Furthermore, when the detachment is started once, the detachment continues even if the flow rate is decreased. Therefore, the flow rate in the first stage is raised to advance the start timing of the detachment, and the flow rate in the second stage is lowered so that the flow rate (consumption energy per unit hour) can be decreased while the detachment reaction is maintained.

When or after the first combustion device 6 is operated during the regeneration operation, the controller 10 operates the second combustion device 7 and the auxiliary air supply unit 15. By the operation of the second combustion device 7, a mixture gas of fuel and air is produced in each of the combustion zones A2 and A3. Air is further supplied to the third combustion zone A3 from the auxiliary air supply unit 15.

The mixture gas produced in the second combustion zone A2 is referred to as a second mixture gas, and the mixture gas produced in the third combustion zone A3 is referred to as a third mixture gas. Since the amount of the air supplied to the third mixture gas is larger than that supplied to the second mixture gas, the excess air ratio of the third mixture gas becomes higher than the excess air ratio of the second mixture gas. Therefore, by appropriately setting the amounts of the fuel and air supplied from the second combustion device 7 and the amount of the air supplied from the auxiliary air supply unit 15, a combustion reaction can be caused in an excess fuel condition in the second combustion zone A2 and a combustion reaction can be caused in an excess air condition in the third combustion zone A3.

The first burned gas from the first combustion zone A1 reaches the second combustion zone A2. Therefore, in the second combustion zone A2, the second mixture gas and the first burned gas are burned and a second burned gas is produced. At this time, the operation (the supply amounts of fuel and air) of the second combustion device 7 is controlled so that the mixture gas of the second mixture gas and the first burned gas becomes an excess fuel condition.

Large amounts of unburned matters are contained in the second burned gas generated in the excess fuel condition. Therefore, the nitrogen oxides (the nitrogen oxides detached from the nitrogen oxide adsorbing material 5) contained in the second burned gas are reduced to nitrogen by the unburned matters also contained in the second burned gas. In this way, the nitrogen oxides contained in the exhaust gas discharged from the internal combustion engine are rendered harmless.

The second burned gas containing the nitrogen and unburned matters is fed to the exhaust downstream side (the third combustion zone A3) by virtue of the gas flows generated by the air nozzles 61 and 71.

In the third combustion zone A3, the third mixture gas and the second burned gas are burned and a third burned gas is produced. At this time, the operation (the supply amounts of fuel and air) of the second combustion device 7 and the operation (the supply amount of air) of the auxiliary air supply unit 15 are controlled so that the mixture gas of the third mixture gas and the second burned gas becomes an excess air condition.

In the excess air condition, the third mixture gas and the second burned gas are burned, and the unburned matters (carbon monoxide and hydrocarbons) contained in the second burned gas are oxidized. Furthermore, the unburned matters generated from the first combustion device 6 to reduce the nitrogen oxides are eliminated. Moreover, the particulate matter is also oxidized and eliminated.

The third burned gas from which the unburned matters are eliminated is fed to the exhaust downstream side by virtue of the gas flow generated by the air nozzle 151 in addition to the gas flows generated by the air nozzles 61 and 71. As a result, the third burned gas is discharged into the atmosphere via the junction exhaust passage 110.

In this embodiment, combustion is caused in an excess fuel state in the second combustion zone A2 and combustion is caused in an excess air state in the third combustion zone A3 by using the second combustion device 7 and the auxiliary air supply unit 15. The configuration in which the combustion in the excess fuel state and the combustion in the excess air state are caused simultaneously is not limited to the configuration according to this embodiment. For example, combustion in an excess fuel state and combustion in an excess air state can also be caused simultaneously even in a configuration in which only the second combustion device 7 is used. In this case, combustion in an excess fuel state is generated in the second combustion zone A2 and combustion in an excess air state is generated in the third combustion zone A3 by using the fact that an excess fuel state is generated in an area close to the fuel injection position and an excess fuel state is generated in an area away from the fuel injection position.

During the post-regeneration operation, the controller 10 operates the first combustion device 6 in an excess air condition as in the case of the pre-regeneration operation. Therefore, when the first burned gas passes through the nitrogen oxide adsorbing material 5, the reducing agents (hydrocarbons and carbon monoxide, i.e., unburned matters) attached to the nitrogen oxide adsorbing material 5 are oxidized and eliminated. The unburned matters attach to the nitrogen oxide adsorbing material 5 since the first burned gas generated in the excess fuel condition passes through the nitrogen oxide adsorbing material 5 during the main regeneration operation performed before the post-regeneration operation. Furthermore, the particulate matter trapped by the nitrogen oxide adsorbing material 5 is oxidized and eliminated.

The first burned gas having passed through the nitrogen oxide adsorbing material 5 is fed to the exhaust downstream side and discharged into the atmosphere via the junction exhaust passage 110.

In this embodiment, the second combustion device 7 is operated only during the main regeneration operation among the pre-regeneration operation, the main regeneration operation and the post-regeneration operation. During the main regeneration operation, the nitrogen oxides detached from the nitrogen oxide adsorbing material 5 are reduced, and the second combustion device 7 is operated to eliminate the reducing agents (unburned matters) having been used to eliminate the nitrogen oxides. Therefore, since nitrogen oxides and reducing agents (unburned matters) are not generated during the pre-regeneration operation and the post-regeneration operation, it is not necessary to operate the second combustion device 7 to eliminate nitrogen oxides and reducing agents (unburned matters). However, the second combustion device 7 may be operated even during the pre-regeneration operation and the post-regeneration operation.

(Effects of this Embodiment)

The exhaust gas purification device 1 according to this embodiment has the following effects.

Since the main regeneration operation is composed of the first stage (the first main regeneration operation) during which the flow rate is high and the second stage (the second main regeneration operation) during which the flow rate is low, the start timing of the detachment is advanced by virtue of the first stage during which the flow rate is high, and the flow rate (consumption energy per unit hour) can be decreased while the detachment reaction is maintained by virtue of the second stage during which the flow rate is low. On the other hand, in the case that the flow rate is set constant, if the flow rate is low, the start timing of the detachment is delayed, and if the flow rate is sufficient, the flow rate after the start of the detachment reaction becomes excessively higher than the flow rate required to continue the detachment reaction. In other words, the implementation time (detachment time) of the main regeneration operation in this configuration in which the flow rate is changed from a high flow rate to a low flow rate can be shortened and the total flow rate (consumption energy) can be decreased in comparison with the configuration in which the flow rate is set constant.

Therefore, the detachment amount of the nitrogen oxides can be increased efficiently without increasing the consumption energy and the time required for the detachment by decreasing the flow rate of the first mixture gas as the stage of the main regeneration operation advances. Furthermore, since the temperature of the nitrogen oxide adsorbing material 5 is raised in the initial stage of the main regeneration operation, the start timing of the detachment is also advanced.

Since the excess air ratio $\lambda$ of the first mixture gas is controlled within the range of $0.6 < \lambda < 1.0$ during the main regeneration operation, the nitrogen oxides can be detached effectively from the nitrogen oxide adsorbing material 5.

Since the excess air ratio $\lambda$ of the first mixture gas is controlled within the range of $\lambda > 1.0$, during the pre-regeneration operation, the amount of the particulate matter trapped by the nitrogen oxide adsorbing material 5 can be decreased. Furthermore, the temperature of the nitrogen oxide adsorbing material 5 can be raised before the start of the main regeneration operation, and the efficiency of the main regeneration operation can be improved.

Since the excess air ratio $\lambda$ of the first mixture gas is controlled within the range of $\lambda > 1.0$ during the post-regeneration operation, the reducing agents (hydrocarbons and carbon monoxide, i.e., unburned matters) attached to the nitrogen oxide adsorbing material 5 can be eliminated, whereby the amounts of the reducing agents discharged outside the purification device when the normal operation is performed can be decreased. Furthermore, the amount of the particulate matter trapped by the nitrogen oxide adsorbing material 5 can also be decreased.

Industrial Applicability

The present invention is applicable to a device purifying exhaust gas discharged from internal combustion engines, such as diesel engines, gas engines, gasoline engines or gas turbine engines, or burning appliances, such as combustion furnaces and boilers.

The invention claimed is:

1. A method for controlling an exhaust gas purification device, the exhaust gas purification device comprising:
   a plurality of branch exhaust passages connected to an exhaust passage on the engine side of an internal combustion engine or a burning appliance;
   an exhaust gas shutoff unit switching between allowing and shutting off the flow of the exhaust gas into the respective branch exhaust passages from the exhaust passage on the engine side by opening or closing the exhaust inlets of the respective branch exhaust passages;
   a nitrogen oxide adsorbing material, disposed inside each of the respective branch exhaust passages, temporarily adsorbing nitrogen oxides in an excess air atmosphere, and detaching the adsorbed nitrogen oxides in a rising temperature atmosphere or a reducing atmosphere;
   a first combustion device, disposed on the exhaust upstream side of the nitrogen oxide adsorbing material inside each of the respective branch exhaust passages, and comprising an air supply unit and a fuel supply unit and an ignition unit, and supplying and burning a first mixture gas of fuel and air; and
   a second combustion device, disposed on the exhaust downstream side of the nitrogen oxide adsorbing material inside each of the respective branch exhaust passages, and comprising an air supply unit and a fuel supply unit and an ignition unit,
   wherein there are normal operation and regeneration operation performed in the respective branch exhaust passages, and wherein the regeneration operation includes main regeneration operation for detaching the nitrogen oxides adsorbed onto the nitrogen oxide adsorbing material, and the main regeneration operation has at least two stages of operation, the method comprising the steps of: allowing the flow of the exhaust gas into the branch exhaust passage subjected to the normal operation by the switching of the exhaust gas shutoff unit during the normal operation;
   operating the first combustion device and the second combustion device while the exhaust gas is prevented from flowing into the branch exhaust passage subjected to the regeneration operation by the switching of the exhaust gas shutoff unit during the regeneration operation;
   controlling the excess air ratio $\lambda$ of the first mixture gas to $\lambda < 1.0$ during the main regeneration operation; and decreasing the flow rate of the first mixture gas as the stage of the main regeneration operation advances, wherein the regeneration operation includes post-regeneration operation as a post-stage of the main regeneration operation, the method further comprising:

controlling the excess air ratio $\lambda$ of the first mixture gas to $\lambda>1.0$ during the post-regeneration operation.

2. A method for controlling an exhaust gas purification device, the exhaust gas purification device comprising:
   a plurality of branch exhaust passages connected to an exhaust passage on the engine side of an internal combustion engine or a burning appliance;
   an exhaust gas shutoff unit switching between allowing and shutting off the flow of the exhaust gas into the respective branch exhaust passages from the exhaust passage on the engine side by opening or closing the exhaust inlets of the respective branch exhaust passages;
   a nitrogen oxide adsorbing material, disposed inside each of the respective branch exhaust passages, temporarily adsorbing nitrogen oxides in an excess air atmosphere, and detaching the adsorbed nitrogen oxides in a rising temperature atmosphere or a reducing atmosphere;
   a first combustion device, disposed on the exhaust upstream side of the nitrogen oxide adsorbing material inside each of the respective branch exhaust passages, and
   comprising an air supply unit and a fuel supply unit and an ignition unit, and supplying and burning a first mixture gas of fuel and air; and
   a second combustion device, disposed on the exhaust downstream side of the nitrogen oxide adsorbing material inside each of the respective branch exhaust passages, and comprising an air supply unit and a fuel supply unit and an ignition unit, wherein there are normal operation and regeneration operation performed in the respective branch exhaust passages, and
   wherein the regeneration operation includes main regeneration operation for detaching the nitrogen oxides adsorbed onto the nitrogen oxide adsorbing material, and the main regeneration operation has at least two stages of operation, the method comprising the steps of:
   allowing the flow of the exhaust gas into the branch exhaust passage subjected to the normal operation by the switching of the exhaust gas shutoff unit during the normal operation;
   operating the first combustion device and the second combustion device while the exhaust gas is prevented from flowing into the branch exhaust passage subjected to the regeneration operation by the switching of the exhaust gas shutoff unit during the regeneration operation;
   controlling the excess air ratio $\lambda$ of the first mixture gas within the range of $0.6<\lambda<1.0$ during the main regeneration operation; and
   decreasing the flow rate of the first mixture gas as the stage of the main regeneration operation advances,
   wherein the regeneration operation includes post-regeneration operation as a post-stage of the main regeneration operation,
   the method further comprising:
   controlling the excess air ratio $\lambda$ of the first mixture gas to $\lambda>1.0$ during the post-regeneration operation.

3. A method for controlling an exhaust gas purification device, the exhaust gas purification device comprising:
   a plurality of branch exhaust passages connected to an exhaust passage on the engine side of an internal combustion engine or a burning appliance;
   an exhaust gas shutoff unit switching between allowing and shutting off the flow of the exhaust gas into the respective branch exhaust passages from the exhaust passage on the engine side by opening or closing the exhaust inlets of the respective branch exhaust passages;
   a nitrogen oxide adsorbing material, disposed inside each of the respective branch exhaust passages, temporarily adsorbing nitrogen oxides in an excess air atmosphere, and detaching the adsorbed nitrogen oxides in a rising temperature atmosphere or a reducing atmosphere;
   a first combustion device, disposed on the exhaust upstream side of the nitrogen oxide adsorbing material inside each of the respective branch exhaust passages, and comprising an air supply unit and a fuel supply unit and an ignition unit, and supplying and burning a first mixture gas of fuel and air; and
   a second combustion device, disposed on the exhaust downstream side of the nitrogen oxide adsorbing material inside each of the respective branch exhaust passages, and comprising an air supply unit and a fuel supply unit and an ignition unit, wherein there are normal operation and regeneration operation performed in the respective branch exhaust passages, and
   wherein the regeneration operation includes main regeneration operation for detaching the nitrogen oxides adsorbed onto the nitrogen oxide adsorbing material, and the main regeneration operation has at least two stages of operation, the method comprising the steps of:
   allowing the flow of the exhaust gas into the branch exhaust passage subjected to the normal operation by the switching of the exhaust gas shutoff unit during the normal operation;
   operating the first combustion device and the second combustion device while the exhaust gas is prevented from flowing into the branch exhaust passage subjected to the regeneration operation by the switching of the exhaust gas shutoff unit during the regeneration operation;
   controlling the excess air ratio A of the first mixture gas within the range of $0.6<\lambda<1.0$ during the main regeneration operation; and
   decreasing the flow rate of the first mixture gas as the stage of the main regeneration operation advances,
   wherein the regeneration operation includes pre-regeneration operation as a pre-stage of the main regeneration and post-regeneration operation as a post-stage of the main regeneration operation,
   the method further comprising:
   controlling the excess air ratio $\lambda$ of the first mixture gas to $\lambda>1.0$ during the post-regeneration operation.

* * * * *